United States Patent

Crouch

[15] 3,645,685
[45] Feb. 29, 1972

[54] CARBON BLACK MANUFACTURE

[72] Inventor: Willie W. Crouch, Bartlesville, Okla.

[73] Assignee: Phillips Petroleum Company, Bartlesville, Okla.

[22] Filed: Nov. 3, 1969

[21] Appl. No.: 873,432

[52] U.S. Cl. ........................................23/209.4, 23/259.5
[51] Int. Cl. ................................................C09c 1/50
[58] Field of Search ............23/209.4, 209.6, 209.8, 259.5, 23/252, 260

[56] References Cited

UNITED STATES PATENTS

| | | | |
|---|---|---|---|
| 2,332,527 | 10/1943 | Pyzel | 23/260 |
| 2,779,665 | 1/1957 | Heller | 23/209.8 |
| 2,801,157 | 7/1957 | Campbell et al. | 23/209.4 |
| 2,877,717 | 3/1959 | Reed | 23/259.5 |
| 3,003,855 | 10/1961 | Heller et al. | 23/209.4 |
| 3,333,928 | 8/1967 | Kobayashi | 23/209.6 |
| 3,369,870 | 2/1968 | Ganz et al. | 23/209.4 |

*Primary Examiner*—Edward J. Meros
*Attorney*—Young and Quigg

[57] ABSTRACT

Carbon black is produced by introducing a hydrocarbon feed and hot combustion gases into a feed introduction zone, passing the resulting mixture into a carbon black formation zone under carbon black forming conditions to produce smoke comprising carbon black, dividing said smoke into separate first and second portions, recycling said first portion of smoke under carbon black forming conditions to the feed introduction zone, and recovering carbon black from said second portion of smoke. Loop reactor apparatus for conducting the process is disclosed.

8 Claims, 1 Drawing Figure

PATENTED FEB 29 1972 3,645,685
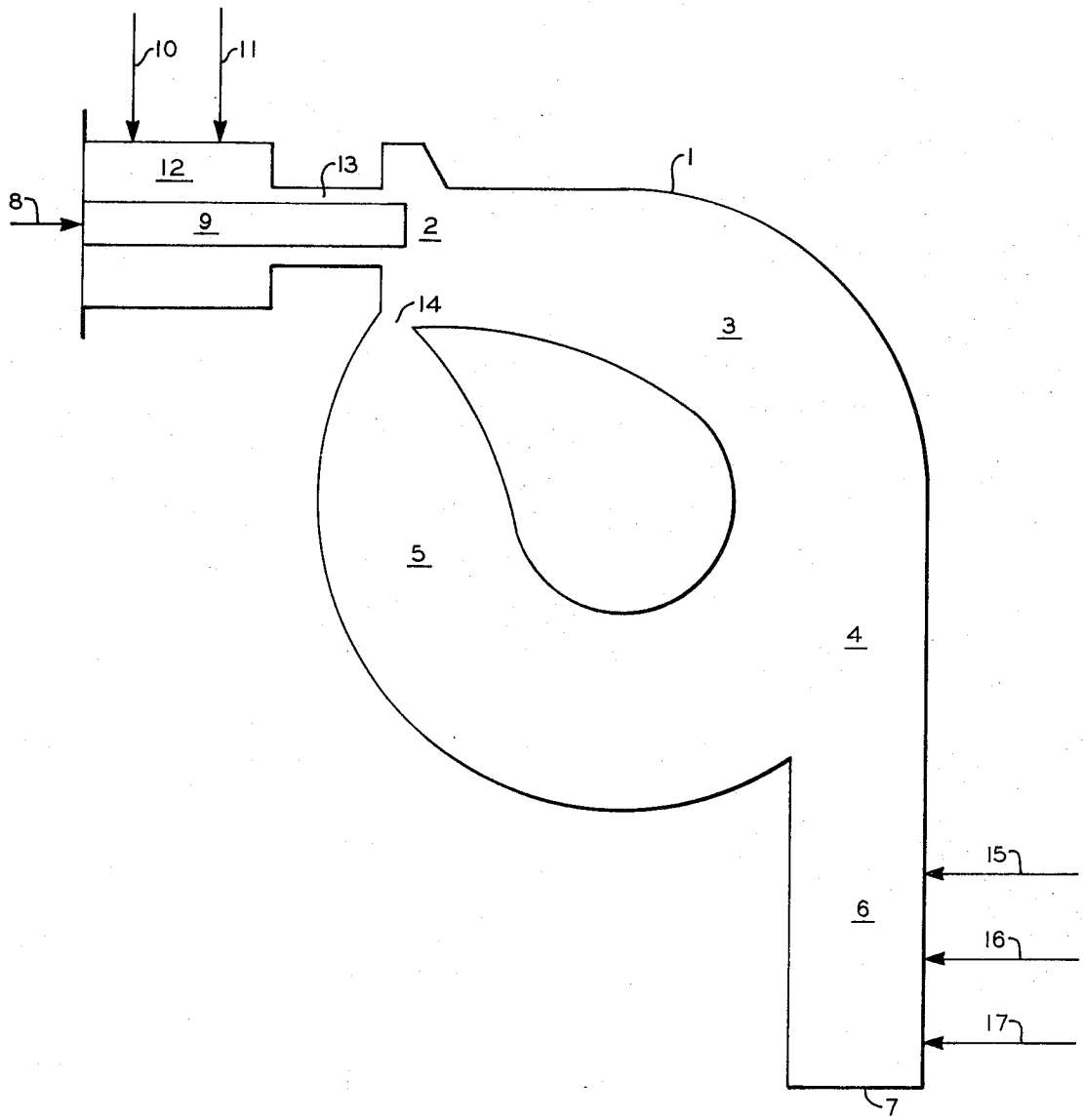
INVENTOR.
W.W. CROUCH
BY
Young & Quigg
ATTORNEYS

CARBON BLACK MANUFACTURE

This invention relates to carbon black manufacture.

In one of its more specific aspects, this invention relates to the production of carbon black in a loop reactor system.

Loop reaction systems are systems in which some portion of the reaction product is recycled through the reaction zone. Such systems are employed in instances in which the reaction approaches equilibrium over an extended time. Such systems are not employed where such recycling will be deleterious to the reaction product after its formation. In spite of the fact that the carbon black production process is one in which the additional reaction time provided in the recirculating loop system might be expected to be deleterious to the black, it has now been found that carbon black of satisfactory quality can be produced in a loop reaction system. This invention provides a process for producing carbon black in such a system.

According to the method of this invention, there is provided a process for the production of carbon black which comprises producing carbon black, as particulate matter in a gas stream, by the pyrolytic decomposition of a hydrocarbon in the presence of a fuel and an oxidant and recycling a portion of the carbon black-containing gas to the zone in which the pyrolytic decomposition takes place, the recycled stream being maintained under carbon black forming conditions while being recycled.

In one of its embodiments, the method of this invention provides a reaction zone of variable capacity.

In another one of its embodiments, the method of this invention provides a self-induced circulation system for recirculating the reaction products into the reaction zone.

Accordingly, it is an object of this invention to provide a novel carbon black producing process.

It is another object of this invention to provide a carbon black reactor having an increased reaction time.

The method of this invention is adaptable to the production of conventional carbon blacks with conventional reactants including conventional hydrocarbon feedstocks or make-oils. The method of this invention is further adaptable to various configurations of loop reactors and to various methods of effecting recycling of the carbon black smoke prior to its quenching. While the following disclosure concerns reactors generally similar in configuration and a self-induced recycling system, the method of this invention is not intended to be so limited.

The method of this invention will be more easily understood if explained in conjunction with the attached drawing which illustrates one embodiment of a reactor employable in practicing the method of this invention. In general, this reactor comprises a loop reaction zone, the loop being formed by recycling a portion of the reaction products, prior to quench, into the feed introduction zone, the unrecycled portion of the reaction products being conducted into an aftertreating zone of variable reaction capacity, that is, of variable reaction time. In the method of this invention, that portion of the reaction product recycled to the reaction, or feed introduction zone, can possess certain properties, while that portion separated from the recycled portion can be further processed to produce a carbon black different in quality from the carbon black recycled.

Referring now to the attached drawing, there is shown the internal outline of reactor 1, the exterior of which is provided with conventional insulation, not shown. Reactor 1 is comprised of feed introduction zone 2, reaction zone 3, separation zone 4, recirculation zone 5 and quench zone 6. Reactants are introduced into feed introduction zone 2, the principal portion of the reaction taking place in zone 3, a separation being made in zone 4 between the reaction products recycled and those recovered. The recycled products are introduced into zone 2 from zone 5, and the carbon black to be recovered is conducted from zone 4 into zone 6 where the black is quenched and from whence it is recovered through nozzle 7. In this embodiment of the invention, zones 2, 3, 4 and 5 form a series of contiguous reaction zones.

Introduction of reactants into the reactor can be made in any conventional manner. In the present instance, hydrocarbon feed, preferably preheated, and a small amount of jacket air, introduced around the feed introduction nozzle, the presence of this air being optional, are introduced through conduit 8 into feed tube 9. An oxidant, for example, air, and a combustible fuel, such as propane, are introduced through conduits 10 and 11 into combustion zone 12. Preferably, the oxidant is introduced in an amount in excess of that stoichiometric quantity required for the complete combustion of the fuel.

Combustion of the fuel takes place in zone 12 and the products of combustion are conducted from zone 12 into zone 2, discharging through aspirating zone 13. The feed discharges from feed tube 9, and the combined mixture from zone 12 and tube 9 enters reaction zone 2. Due to the constricted flow through zone 13, some portion of the reaction products recirculating from zone 5 are drawn into zone 2 through constricted opening 14 between zones 5 and 2.

Conversion of the feedstock takes place in zones 2 and 3 and a separation is made in zone 4 between that portion of the reaction product recirculated and that portion recovered from the reactor. The invention contemplates the recirculation of any quantity desired. Quantities greater than those possible to recirculate by aspiration can be recirculated by extraneous means, such as a compressor, not shown.

Those reaction products withdrawn from the reactor are conducted into zone 6 where they are quenched by the conventional quench materials introduced at points 15, 16 or 17, or any combination of these points. Depending upon the point of quench introduction into zone 6, the reaction volume, and time, of aftertreatment to which the carbon black in the smoke is subjected can be varied.

Various modifications of the embodiment of the reactor shown can be made. By varying the configuration of the contiguous zones 2, 3, 4 and 5 from circular to elliptical, the various zones can be given different lengths and the reactor given different reaction zone ratios. Similarly, the length of quench zone 6 can be altered to give a different relationship between its length and that of zone 5, or between its length and that of zones 2, 3, and 4 preceding it.

Under conventional conditions of temperature and pressure, air-to-oil ratios and the like, as normally employed in the production of furnace carbon black, a series of runs was made. The feedstock employed was benzene, the fuel was propane and its oxidant was air. In general, the amount of product recycled from zone 5 to zone 2 was about one-half the total product entering zone 4. Introduced with the feedstock was a minor quantity of aspirating air. The quantity of air introduced with the fuel was about 1-½ times the amount required for its complete combustion as discussed hereinafter.

The total volume of zones 2, 3 and 4 was 255 cubic inches and that of zone 5 was 230 cubic inches. The volume of zone 6 was variable. Results of the series of runs made at varying air rates and at varying volume relationships between zone 6 and the total volume of zones 2, 3 and 4 were as follows:

| Benzene feed rate, No./hour | Air rate, m.c.f.h. | Total volume zones 2, 3 and 4 | Volume, zone 6 | No./gal. | Yield percent carbon production basis carbon in feed and fuel | Carbon black surface area, $N_2SA$, $m.^2/g.$ |
|---|---|---|---|---|---|---|
| 49.5 | 6 | 255 | 105 | 2.74 | 30.0 | 135 |
| 35.2 | 4 | 255 | 225 | 2.93 | 32.5 | 115 |
| 54.5 | 6 | 255 | 225 | 2.79 | 31.4 | 131 |
| 65.2 | 8 | 255 | 225 | 2.45 | 26.8 | 142 |
| 37.2 | 4 | 255 | 400 | 3.08 | 34.7 | 105 |
| 62.2 | 6 | 255 | 400 | 3.38 | 39.1 | 104 |
| 82.3 | 8 | 255 | 400 | 3.41 | 39.4 | 104 |
| 63.2 | 6 | 255 | 655 | 3.30 | 38.3 | 98 |
| 73.5 | 6 | 255 | 1395 | 3.77 | 45.1 | 75 |

The above data indicate the operability of the method of this invention.

In the above runs, that smoke recycled through the loop was subjected to the sum of the volumes of zones 2, 3 and 4 plus the 230 cubic inches of zone 5 per cycle. That smoke or product recovered from zone 6 was subjected to the sum of the reactor volumes of zones 2, 3 and 4 plus that indicated for zone 6. At the lowest total reactor volume of 360 cubic inches for the recovered product, assuming equal product to recirculation rates, the smoke recycled to zone 2 had a greater degree of aftertreating than had the product since the product passed through a volume of only 105 cubic inches in zone 6 before quenching, while the volume of recirculation section 5 was 230 inches. At a zone 6 volume of 225 cubic inches, the recovered product and the recycle were at about the same stage of treatment since both are passed through equivalent volumes of the reactor. At a zone 6 volume of 400 cubic inches, and above, the recovered black received more aftertreatment than did the recycle black. In all runs, the amount of total air was 150 percent of the stoichiometric requirement for combustion of the fuel.

The following series of runs indicate the effect of altering hydrocarbon feed inlet velocity at constant reactor volume and at substantially constant reactor throughout. The feed inlet velocity was altered by changing the area of the hydrocarbon feed tube. Data are as follows:

| Run No. | Benzene feed rate, No./hr. | Benzene inlet velocity, ft./sec. | Air rate, mcfh | Reactor volume, cu. inches | Carbon black yield | | Carbon black surface area, $N_2SA$, $m^2/g$. |
|---|---|---|---|---|---|---|---|
| | | | | | No. gal. | Percent basis carbon in feed and fuel | |
| 1 | 46.7 | 0.23 | 6 | 480 | 2.14 | 23.1 | 137 |
| 2 | 54.5 | 0.54 | 6 | 480 | 2.79 | 31.4 | 128 |
| 3 | 46.9 | 0.87 | 6 | 480 | 2.41 | 25.7 | 144 |
| 4 | 49.8 | 0.93 | 6 | 480 | 2.66 | 29.1 | 124 |
| 5 | 37.2 | 0.40 | 4 | 655 | 3.08 | 34.7 | 104 |
| 6 | 41.0 | 0.76 | 4 | 655 | 3.31 | 38.1 | 93 |
| 7 | 43.0 | 1.85 | 4 | 655 | 3.58 | 41.7 | 94 |

The above data indicate the effect of the hydrocarbon feed inlet velocity on yields and on the surface area of the black produced.

In all runs except runs 2 and 3, the jacket air was 250 cubic feet per hour. In Run 2, the jacket air was 325 s.c.f.h. and in Run 3 the jacket air rate was 425 s.c.f.h. Accordingly, the data indicate that the system is sensitive to jacket air effects, although the effect of the incremental quantity of jacket air was to increase the amount of air in the system only from 150 percent to 153 percent of the stoichiometric requirement for combustion of the fuel.

The amount of aspiration, as mentioned, affects the amount of recycle from zone 4, in the absence of extraneous means for establishing recycle. The velocity of the combustion mixture which induces aspiration can be varied over wide ranges, for example, being effective over a range from about 400 ft./sec. to about 1,400 ft./sec. in the above reactors. These figures are meant only to establish parameters from which ranges for any particular operation can be developed.

Various modifications can be made to the method of this invention in light of the above disclosure. Such are, however, considered as being within the scope of this invention.

What is claimed is:

1. A process for the production of carbon black by the pyrolytic decomposition of a hydrocarbon feed by bringing said hydrocarbon feed to its carbon black forming temperature by contacting said hydrocarbon feed with hot combustion gases produced by oxidation of a fuel with a free oxygen-containing gas which comprises:
   a. introducing hydrocarbon feed and hot combustion gases into a feed introduction zone;
   b. passing said feed and said hot combustion gases into a carbon black formation zone under carbon black forming conditions to produce smoke comprising carbon black;
   c. dividing said smoke into separate first and second portions;
   d. recycling said first portion of smoke to said feed introduction zone, said smoke being maintained under carbon black forming conditions during said recycling; and,
   e. quenching said second portion of smoke in the absence of recycling to said feed introduction zone and recovering the carbon black.

2. The process of claim 1 in which said first portion of smoke is maintained under carbon black forming conditions during said recycling for a period sufficient to alter the properties of the carbon black in said smoke.

3. The process of claim 1 in which said second portion of said smoke is maintained under carbon black forming conditions prior to said quenching for a period sufficient to alter the properties of the carbon black in said smoke.

4. The process of claim 1 in which said first portion of said smoke is induced to recycle by the introduction of said hot combustion gases into said feed introduction zone.

5. The process of claim 3 in which said first and said second portions of smoke are maintained under substantially identical carbon black forming conditions.

6. The process of claim 3 in which said first and said second portions of smoke are maintained under unidentical carbon black forming conditions.

7. The process of claim 1 in which said first and said second portions are unequal in quantity.

8. The process of claim 1 in which the quantity of said first portion is controlled by the rate of introduction of the combustion gases into said feed introduction zone.